US008408500B2

(12) United States Patent
Crepin et al.

(10) Patent No.: US 8,408,500 B2
(45) Date of Patent: Apr. 2, 2013

(54) CABLE CARRIER CHAIN FOR LEADING EDGE MOBILE SLAT FOR AN AIRCRAFT WING

(75) Inventors: Jean-Philippe Crepin, Ath (BE); Xavier Godfroid, Louvain-la-Neuve (BE); Olivier Souchon, Loverval (BE)

(73) Assignee: Sonaca S.A., Gosselies (BE)

( * ) Notice: Subject to any disclaimer, the term of this patent is extended or adjusted under 35 U.S.C. 154(b) by 602 days.

(21) Appl. No.: 12/668,752

(22) PCT Filed: Jul. 9, 2008

(86) PCT No.: PCT/EP2008/058895
§ 371 (c)(1),
(2), (4) Date: Feb. 24, 2010

(87) PCT Pub. No.: WO2009/010431
PCT Pub. Date: Jan. 22, 2009

(65) Prior Publication Data
US 2010/0193642 A1   Aug. 5, 2010

(30) Foreign Application Priority Data
Jul. 13, 2007   (BE) .................................. 2007/0350

(51) Int. Cl.
*B64C 9/24* (2006.01)
*B64C 13/30* (2006.01)

(52) U.S. Cl. ........................................ 244/214; 244/99.3

(58) Field of Classification Search .................. 244/99.3, 244/213, 214, 215, 216
See application file for complete search history.

(56) References Cited

U.S. PATENT DOCUMENTS

| 2,990,140 | A | * | 6/1961 | Mazelsky ....................... 244/210 |
| 6,286,790 | B1 | * | 9/2001 | Thorpe .......................... 244/214 |
| 6,387,002 | B1 | | 5/2002 | Gunter |
| 6,394,396 | B2 | * | 5/2002 | Gleine et al. .................. 244/198 |
| 2007/0034747 | A1 | | 2/2007 | Amorosi et al. |

FOREIGN PATENT DOCUMENTS

| EP | 0 230 684 A1 | 8/1987 |
| EP | 0 277 389 A1 | 8/1988 |
| WO | 2006/027624 A1 | 3/2006 |

OTHER PUBLICATIONS

International Search Report for PCT/EP2008/058895.

* cited by examiner

*Primary Examiner* — Rob Swiatek
(74) *Attorney, Agent, or Firm* — Pearne & Gordon LLP

(57) ABSTRACT

An aircraft wing comprising a wing fixed central body, and a leading edge mobile slat (16) designed to be moved in rotation relative to the fixed central body along a circular trajectory inscribed on a sphere with center (C). According to the invention, the wing also comprises a cable carrier chain (30) comprising links (34) articulated to each other through articulation axes (44) that converge towards a single point, the chain being connected at its two ends to the fixed central body and to the mobile slat. Furthermore, the single point is the center (C) of the sphere, located on a rotation axis (42) of the leading edge mobile slat relative to the wing fixed body.

8 Claims, 10 Drawing Sheets

CABLE CARRIER CHAIN FOR LEADING EDGE MOBILE SLAT FOR AN AIRCRAFT WING

TECHNICAL FIELD

This invention generally relates to the domain of means used to support cables fixed on two parts free to move relative to each other along a circular trajectory.

These means that make it possible to support cables are also called cable transfer means or guide means between two parts free to move relative to each other, with a design that allows them to follow the relative displacement between the two parts onto which the cables are connected. For example the cables may be electrical or other cables.

The invention relates more specifically to the domain of aircraft wings, such cable carrier means being provided between a wing fixed central body and a leading edge mobile slat that will be rotated relative to the fixed central body along a circular trajectory that can be inscribed on a sphere. For guidance, the cables supported by the means provided for this purpose are electrical cables that will supply power to an electrical de-icing system integrated into the leading edge mobile slat.

STATE OF PRIOR ART

Each of the two wings on an aircraft is usually fitted with mobile high-lift slats and flaps mounted on the leading edge and the trailing edge of the wing.

Slats and flaps are deployed during the landing and takeoff phases in order to increase the lift at low or medium speed. During cruising flight at high speed, the mobile slats and flaps are retracted to limit aircraft drag. Furthermore, in a manner known to those skilled in the art, each slat and flap is displaced by means of mechanisms housed essentially in the forward or aft part of a wing fixed central body, as disclosed particularly in document EP 0 818 387.

More precisely, these movement control mechanisms displace each leading edge mobile slat along a circular trajectory relative to the wing fixed central body, between a retracted position in which the slat effectively matches the fixed body and an extended position in which the slat is moved forwards.

The leading edge mobile slat includes systems that must be powered at all times, for example electrically, regardless of the position occupied by this slat. These systems include a de-icing system integrated into the mobile slat, electrically powered by one or several cables fixed onto the wing fixed central body, and the function of which is therefore to transfer electrical power between this fixed body and the slat concerned.

Thus, mechanical means are installed to support cables between the fixed body and the leading edge mobile slat, these means having an appropriate design according to which they can deform so as to follow the relative rotational displacement of the mobile slat relative to the wing fixed central body.

Such extendable mechanical cable support structures are disclosed for example in documents WO 2006/027624 and FR 2 874 370. Despite their widespread use, they have several disadvantages, including their large size when extended. This disadvantage related to the large size along the direction of the wing span and/or along its chord, is particularly problematic when these mechanical structures are housed in a forward part of the wing fixed central body which is already congested, particularly due to the presence of slat movement mechanisms. Therefore, risks of mechanical interference between the different elements present in the forward part of the fixed central body are not negligible.

Furthermore, the design of these mechanical structures is not well adapted to the rotational nature of the relative displacement of the mobile slat relative to the fixed central body. This creates another disadvantage which is that a large opening has to be provided on the fixed central body to allow the mechanical structure to pass while it is being extended. Such an opening reduces the aerodynamic efficiency, and it must be limited or closed by a closer and an aerodynamic seal. This increases the complexity and significantly complicates the general design of the mechanical system.

Furthermore, the use of known mechanical means connecting the leading edge mobile slat to the fixed central body has a harmful effect on aerodynamic performances.

OBJECT OF THE INVENTION

Therefore, the purpose of the invention is to at least partially overcome the disadvantages mentioned above related to embodiments according to prior art.

To achieve this, the object of the invention is an aircraft wing comprising a wing fixed central body and a leading edge mobile slat designed to be moved in rotation relative to said fixed central body along a circular trajectory inscribed on a sphere with centre (C), located on a rotation axis of the leading edge mobile slat relative to the wing fixed central body. According to the invention, said wing also comprises an assembly comprising a chain and at least one cable supported by said chain connected rigidly at its two ends to the fixed central body and to the leading edge mobile slat, said chain comprising links articulated to each other through articulation axes that converge towards the centre (C).

Thus, the chain used is quite suitable for connecting two parts that will move relative to each other along a circular trajectory, and more generally along an arbitrary trajectory inscribed on a sphere centred at the single point towards which the articulation axes of the links converge. The chain movement kinematics encountered following movement of the mobile part relative to the other part, is then close to the kinematics of this mobile part. Consequently, the size of the cable carrier chain according to the invention is globally optimised.

In this respect, in the preferred case in which said articulated links are arranged on a spherical surface centred on said single point towards which said articulation axes converge, the chain movement kinematics is globally inscribed on this spherical surface. The observed kinematics is then extremely similar to the kinematics of a part free to move in rotation relative to another part, along a rotation axis passing through the centre of the spherical surface, corresponding to the single point towards which the chain link articulation axes converge.

In this respect, note that in any static state of the links, the links will also be arranged on a cone for which the vertex is the single point towards which said articulation axes converge. Furthermore, each moving link moves on the above-mentioned spherical surface, but also on a conical surface for which the vertex is the single point towards which said articulation axes converge.

In this case in which the trajectory of the relative movement between the two parts is circular, this trajectory arranged on the sphere centred at the single point towards which the articulation axes of the links converge, is not necessarily located in an equatorial plane of this sphere, but it could be arranged in any other plane passing through this sphere orthogonal to the rotation axis of the part free to move with respect to the other part. This specific feature offers a wide range of design possibilities for the chain according to the invention, so that it can be adapted to the dimensional constraints specific to each case.

Therefore, the chain used can support cables between the fixed body and the leading edge mobile slat, with a design particularly well adapted to deformation with a limited size following relative rotational displacement of the mobile slat relative to the wing fixed central body.

This reduction in the global size along the direction of the wing span and the wing chord advantageously makes it easy to fit it inside the forward part of the wing fixed central body, although this area is already very congested, particularly due to the presence of the slat movement mechanisms. In this respect, note that the risks of mechanical interference with the different elements already present within the forward part of the fixed central body are advantageously reduced. In particular, the chain kinematics is not at all disturbed by the slat rotary actuation shaft, although it is arranged in the direction of the wing span in the forward part of the wing fixed central body, given that the design of the chain specific to this invention is such that it can move around this actuation shaft, along said above-mentioned spherical surface.

Note also that the single point towards which the articulation axes converge may be fixed freely on the mobile slat rotation axis, which makes it possible to optimise adaptation of the size to the internal architecture of the wing concerned.

Furthermore, due to design that is perfectly adapted to the rotary nature of the relative displacement of the mobile slat relative to the fixed central body, the necessary opening on the fixed central body to allow the chain to pass through is very much reduced. This reduction of the opening can increase the global aerodynamic efficiency of the aircraft.

Preferably, each said articulated link defines at least one cable passage housing, opening up on each side of said link. Alternately, it would be possible for the cable(s) to be placed outside the links rather than inside, without going outside the scope of the invention.

Preferably, the amplitude of the relative pivoting between any two consecutive links is limited by a system of stops, this pivoting amplitude for example being less than or equal to 30°, and more generally fixed so as to respect the bending limit for the cables concerned.

Naturally, the cables in the assembly supported by the chain are connected firstly to the first part and secondly to the second part between which an electrical or other connection is required.

Preferably, a top view of said chain shows a first approximately straight portion starting from a first chain end link fixed onto said wing fixed central body, a curved part, and a second approximately straight portion terminated by a second chain end link rigidly fixed onto said leading edge mobile slat, regardless of the position of said leading edge mobile slat relative to the wing fixed central body. In such a case, said curved part forms approximately a portion of a circle and preferably a half circle as seen in a top view, with first and second straight portions remaining approximately parallel and at an equal distance during movement of the cable carrier chain, during extension/retraction of the mobile slat.

Said chain supports one or several electrical cables supplying power to a de-icing system integrated into the leading edge mobile slat. In this case, other electrical cables connected to sensors associated with the de-icing system and also integrated into the slat, can be supported by the chain according to this invention.

Preferably, the cables and the chain itself can be protected by a flexible plastic jacket external to the chain that does not disturb its operation. The conferred protection is designed to prevent shocks during maintenance and aggression by chemical agents and fluids used in the aircraft. The first link of the chain can possibly be metallised to provide protection against lightning.

Other advantages and characteristics of the invention will become clear in the non-limitative description given below.

BRIEF DESCRIPTION OF THE DRAWINGS

This description will be made with reference to the appended drawings among which.

DETAILED DESCRIPTION OF PREFERRED EMBODIMENTS

Figure 1:
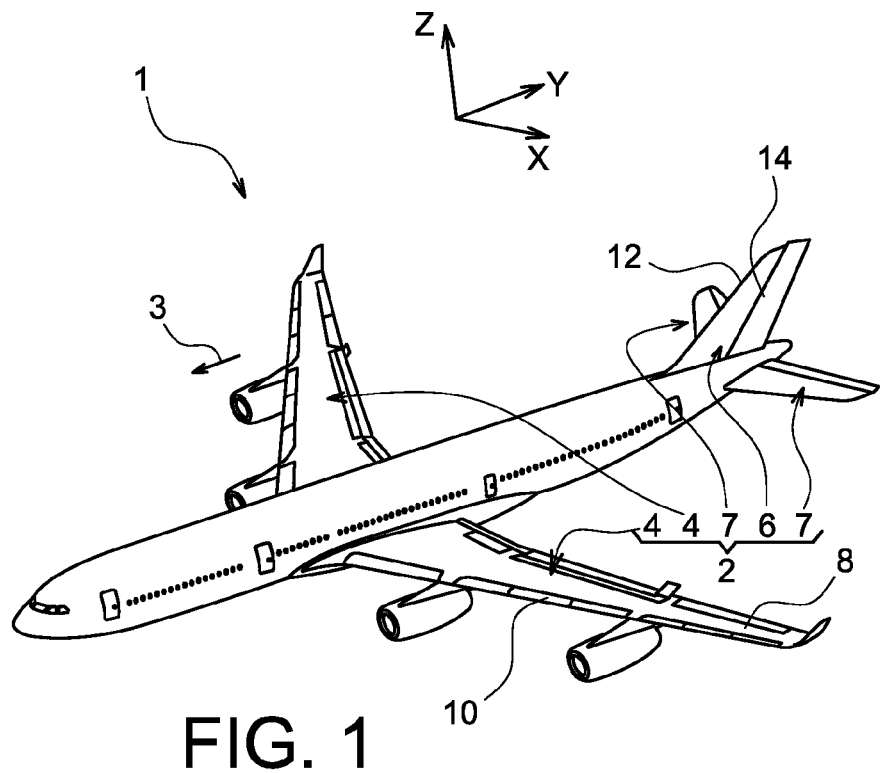
FIG. 1 shows a perspective view of an aircraft.

FIG. 1 shows an aircraft with a wing 2 composed of a plurality of wing elements, also called aerodynamic lift surfaces.

In the following description, the terms "forward" and "aft" should be considered relative to a direction of progress of the aircraft that occurs as a result of the thrust applied by the aircraft engines, this direction being shown diagrammatically by the arrow 3.

The wing elements of the aircraft 1 include two principal wings 4, a vertical stabiliser 6 and two horizontal stabilisers 7 at the aft end of this aircraft. Each of the two wings 4 may be fitted with at least one leading edge mobile slat connected to a wing fixed central body through a cable carrier chain according to the invention as will be shown below in a detailed manner for one of these two wings.

Concerning the wings 4, as mentioned above, each wing comprises a wing fixed central body 8, also called the principal central portion, this body forming practically the entire wing and being located behind a leading edge 10. Once again, throughout the following description, by convention the X direction refers to the longitudinal leading edge direction or the wing span direction, Y refers to the direction transverse to the leading edge 10 of the wing 4 and Z is the vertical direction, these three directions being orthogonal to each other.

Figure 2:
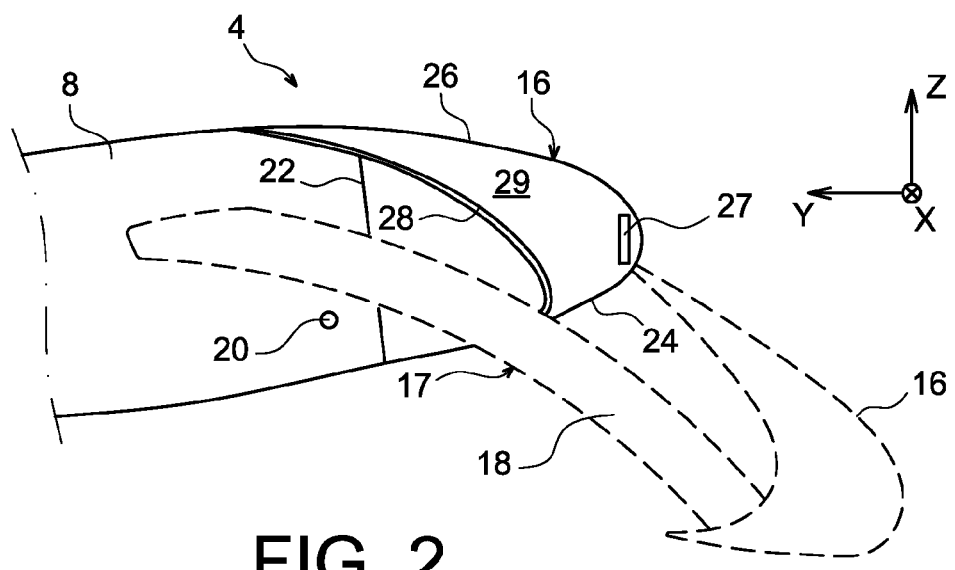
FIG. 2 shows a partial schematic sectional view of an aircraft wing according to this invention fitted with a leading edge mobile slat.

Thus, as shown in FIG. 2, the leading edge of each of the two wings 4 can effectively be fitted with at least one leading edge mobile slat 16, each designed to be connected to the bodies 8 through a cable carrier chain according to the invention, not shown in this figure. On the other hand in FIG. 2, it can be seen that the leading edge mobile slat 16, shown diagrammatically only, can occupy a retracted position in which it matches the forward part of the fixed central body 8 of the wing 4, as shown in solid lines. Furthermore, the dashed lines represent the fully extended position of the mobile slat 16 in which it is at a distance forwards from the fixed central body 8, this extended position being adopted during landing and takeoff phases to increase lift at low or medium speeds. Note that the wing 4 comprises displacement mechanisms 17 essentially integrated into the forward part of the central body 8 in order to move from one of the extreme positions shown to the other, these mechanisms 17 being well known to those skilled in the art.

More precisely, the mechanism 17 for each slat 16 generally comprises one or several curved rails 18 with a circular profile, connected to the slat 16 by its forward end. A gear or similar means (not shown) controlled by a shaft or a rotary actuation arm 20 displaces the slat in rotation relative to the fixed body 8. For guidance, the actuation shaft 20, rotating about its axis is housed in the forward part of the wing fixed body 8, preferably along the wing span direction, while remaining aft from a bulkhead or forward spar 22 also oriented along the wing span direction and connecting the lower and upper portions of the wing fixed body 8.

For information, the mobile slat 16 for example extends over practically the entire length of the wing 4 concerned, obviously along the span direction of this wing 4, or only on a portion of this wing as is more typical on aircraft.

The slat 16 comprises an aerodynamic skin defining a lower portion 24 and an upper portion 26. It is also closed in the aft direction by a closing skin 28 that will match the wing fixed body 8 when it occupies the retracted position shown in solid lines.

The outer skins 24, 26, 28 jointly define a compartment 29 containing one or several systems/items of equipment that normally need to be connected to the fixed body 8 by cables, such as an electrical de-icing system 27 shown diagrammatically in 2.

Figure 3:
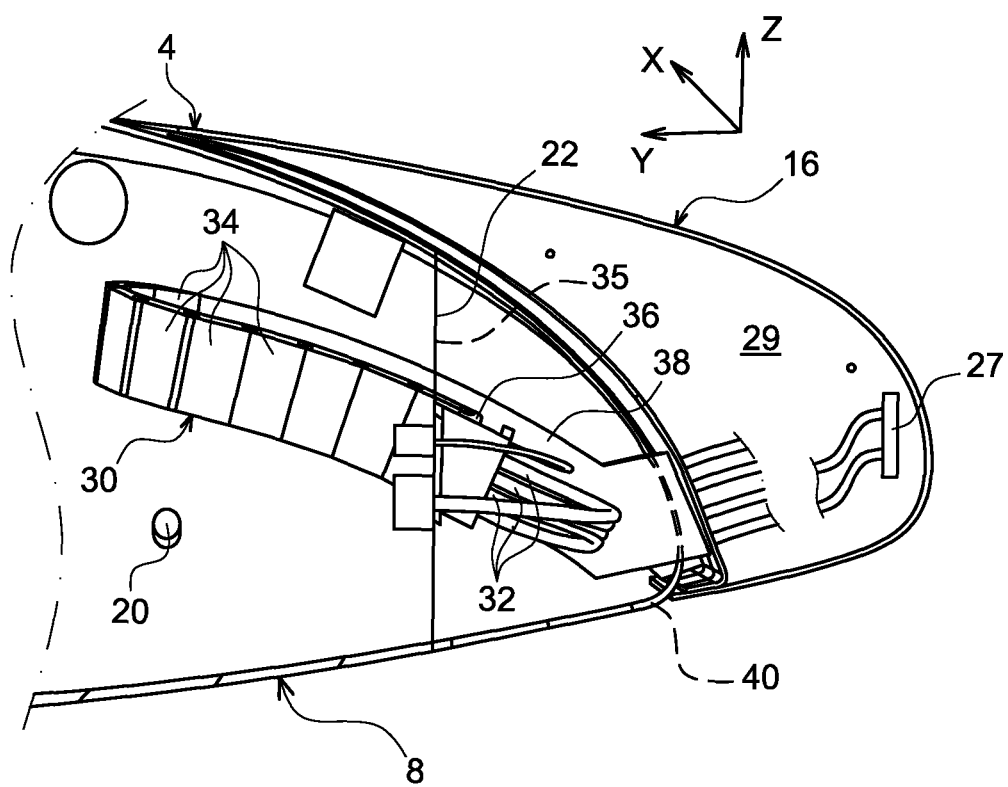
FIG. 3 shows a view similar to that in FIG. 2 showing a cable carrier chain, rigidly fixed to the wing fixed central body at one end and to the leading edge mobile slat of the wing at the other end.
Figure 4:
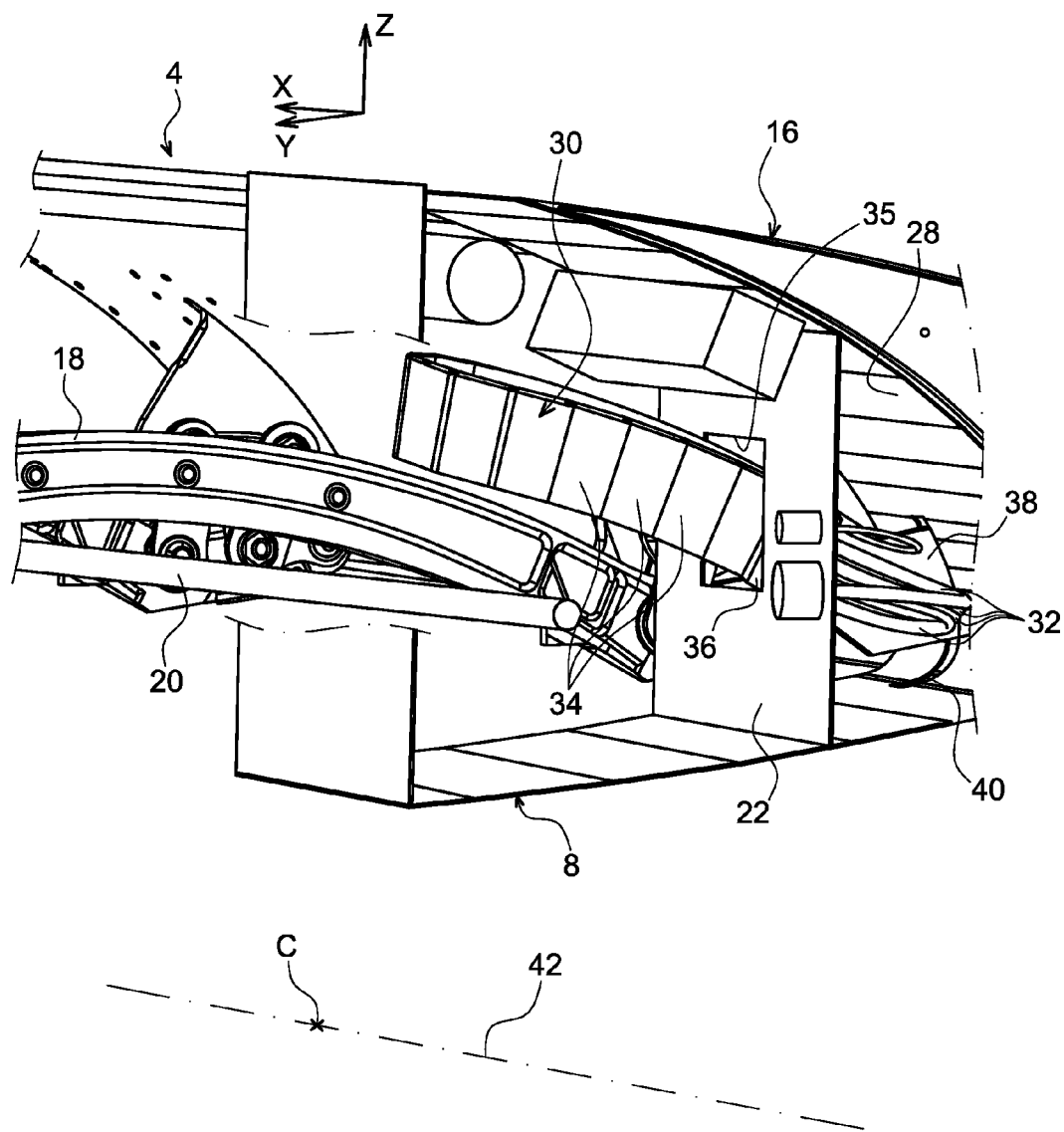
FIG. 4 shows a perspective view of the view shown in FIG. 3.

Thus, a chain 30 is placed between the slat 16 and the fixed body 8 in order to support the cables 32 as shown in FIGS. 3 and 4, so that these cables can follow the movement of this slat when it is extended and retracted, this chain 30 thus performing a cable routing/guidance/support function between the mobile slat 16 and the fixed body 8.

As will be described below, the design of the chain 30 is perfectly adapted to the rotary nature of the relative displacement of the mobile slat 16 relative to the fixed body 8. In this respect, the chain 30 that is globally composed of approximately identical intermediate links 34 and two chain end links that can be different from the intermediate links, might pass through a passageway 35 formed in the forward bulkhead 22. Furthermore, the first chain end link 36 is fixed to the leading edge of the wing fixed central body 8, for example at the forward bulkhead 22, while the second chain end link 38 is fixed to the slat closing skin 28. To achieve this, this second link 38 passes through an opening 40 formed in the forward skin of the fixed central body 8, the extent of this opening being advantageously small because the chain design is perfectly adapted to the rotary nature of the displacement of the slat 16. In this respect, note that the relative displacement of the slat 16 takes place about a rotation axis 42 offset downwards from the wing 4, this axis 42 preferably being parallel to the wing span direction and parallel to the rotary actuation shaft 20 housed in the fixed body 8.

The design of the cable 32 carrier chain 30 will now be described, firstly with reference to FIGS. 5 to 7.

One of the special features of this invention is the design whereby the intermediate links 34, preferably all of them, are articulated to each other about articulation axes 44 that all converge towards a single point C, located on the rotation axis 42 of the mobile slat 16. Furthermore, the articulation axis between the first end link 36 and the first intermediate link 34 of the chain also passes through the point C, like the articulation axis between the second end link 38 and the last intermediate link 34.

Figure 5:
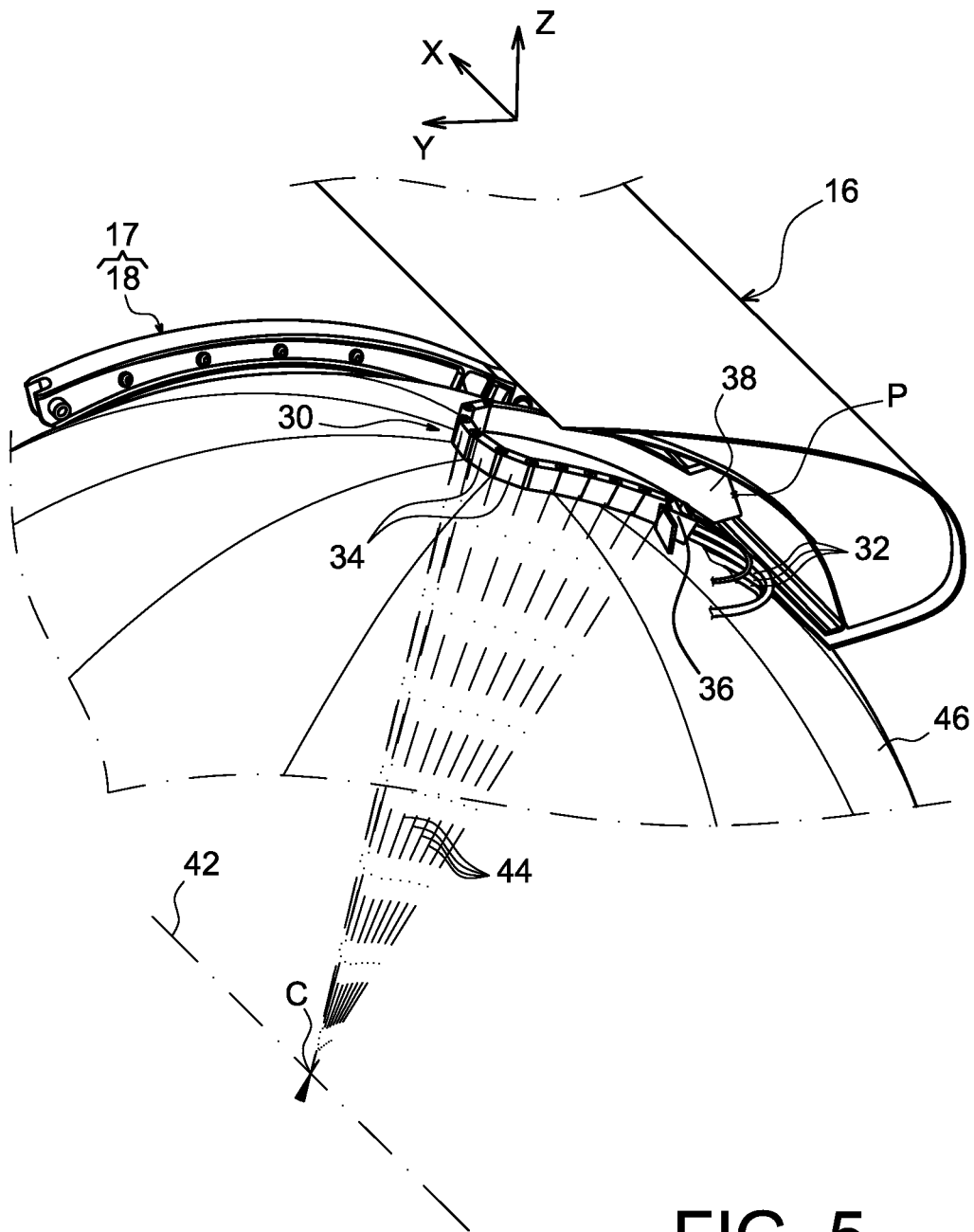
FIG. 5 shows a perspective view schematically showing one of the features of the cable carrier chain, related to the articulation of its links.
Figure 6:
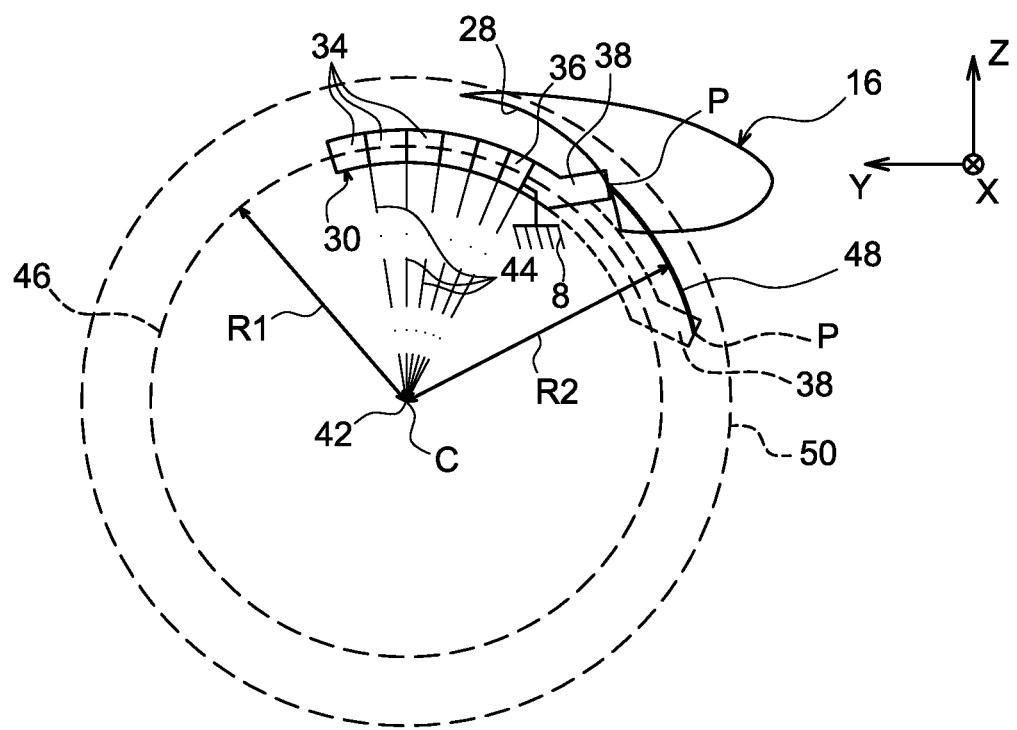
FIG. 6 shows a side view of the view shown in FIG. 5, the chain being shown in solid lines in its position as occupied when the mobile slat is retracted and in dashed lines in its position occupied when the mobile slat is extended.

As can be seen better in FIGS. 5 and 6, the links 34, 36, 38 are arranged on a spherical surface 46 that is centred on the single point C towards which the articulation axes 44 converge, such that the global kinematics of the chain movement are practically inscribed on the same spherical surface 46. In other words, when the second end link 38 is entrained by the movement of the slat 16, all links in the chain are displaced relative to the fixed body 8, while remaining arranged on the above-mentioned spherical surface 46, obviously except for the first end link 36 that remains fixed on the forward bulkhead 22 of the fixed body 8. For guidance, the dashed line 46 in FIG. 6 shows the circumference of the spherical surface in an equatorial plane of this surface, which in particular explains the reason why the chain links are radially inwards from this line.

The kinematics of the chain 30 are then extremely similar to the kinematics of the slat 16, for which the movement trajectory relative to the fixed body 8 follows an arc of a circle 48, as is also shown in FIG. 6. In this respect, note that the circular trajectory 48 of the slat 16 is inscribed on a sphere 50 with the same centre C as the spherical surface 46 located on the rotation axis 42. The trajectory 48 is based starting from a point P taken arbitrarily on the slat 16, and which in the figure is at the interface between the closing skin 28 of the slat and the second end link 38. Naturally, in a view like that shown in FIG. 6, the trajectory of each point on the slat 16 is identical, and in any case is inscribed on a sphere with centre C and radius R2, which in the example shown is greater than radius R1 of the spherical surface 46 on which the chain links are located and move.

Thus, as mentioned above, the trajectory 48 of the slat is located on the sphere 50 with centre C corresponding to the single point towards which the articulation axes 44 converge. Nevertheless, this trajectory 48 is not necessarily located in an equatorial plane of this sphere 50, but it may be arranged in any plane passing through this sphere orthogonal to the rotation axis 42 including the centre C, as is the case in the example shown. The dashed line 50 in FIG. 6 shows the circumference of the sphere 50 in an equatorial plane of this sphere. The radial position of the trajectory 48 inwards from the line 50 clearly shows that it is not located in an equatorial plane of the sphere, but is in a plane parallel to the equatorial plane and orthogonal to the rotation axis 42.

Consequently, it should be understood that the position of the trajectory 48 on the sphere 50, and the position of the links on the spherical surface 46, depend on the position of the centre C on the rotation axis 42, which the designer can choose freely. This specific feature can give a wide range of design possibilities for the chain 30, to optimise adaptation to dimensional constraints present within the wing fixed body 8.

For guidance, note that the fact that the point C is eccentric on the rotation axis 42 relative to the chain 30 makes it possible to incline this chain relative to the direction of the wing span which can give a significant advantage as a function of the internal architecture encountered for the body 8.

Figure 7:
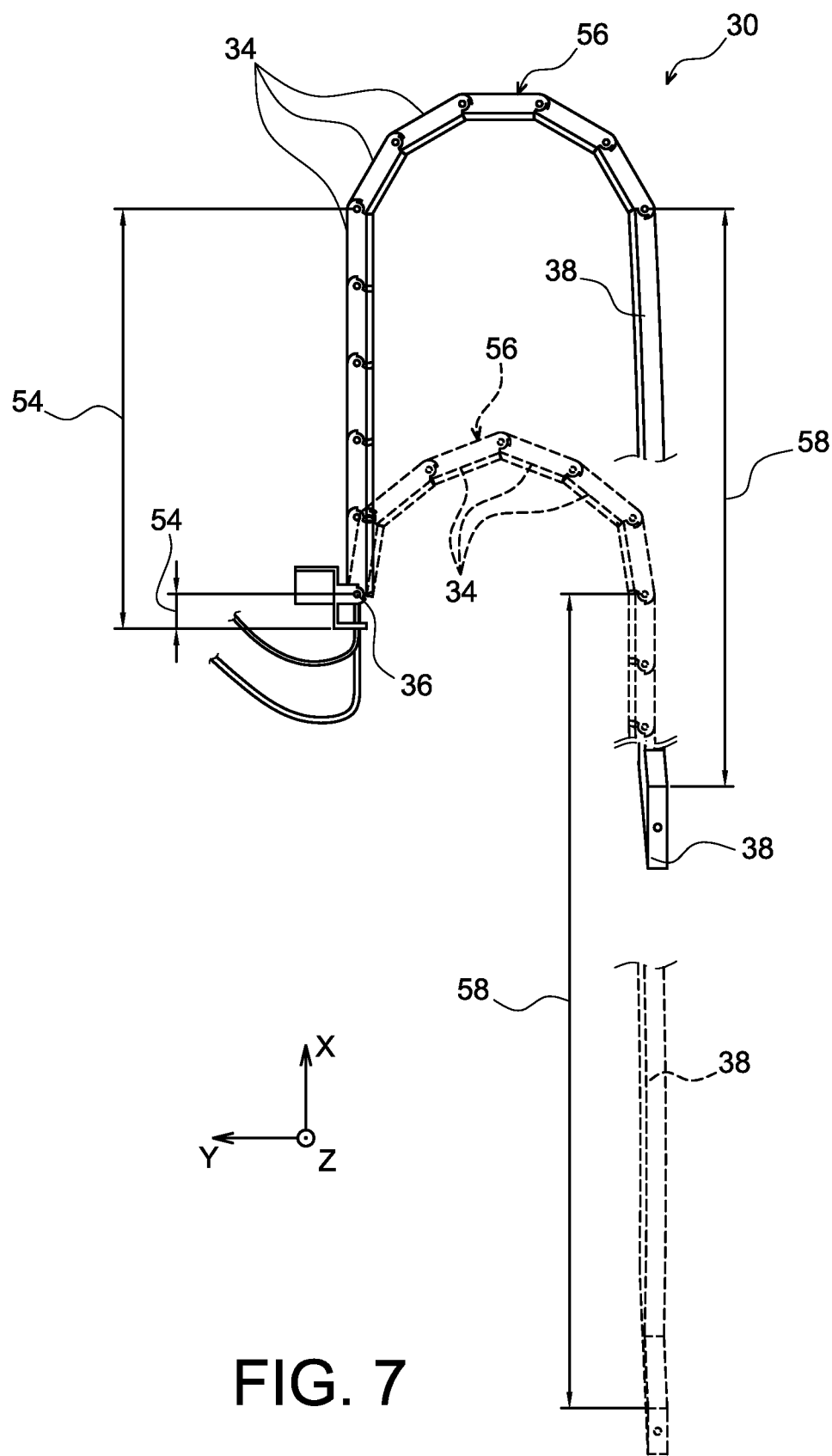
FIG. 7 shows a top view of the cable carrier chain in its two positions shown in FIG. 6.

With reference more precisely to FIG. 7 showing a top view, the chain 30 shown in solid lines is represented in its position as occupied when the slat 16 is retracted. As will be described in detail below, the stops observed between the links result in a self-stable chain and therefore its configuration cannot be changed until its second end link 38 has been moved by the slat 16. Thus, risks of coming into contact with the walls of the passage 35 through which it passes are practically zero.

In this position, and looking at the top view, the self-stabilised chain 30 supporting the cables 32 is approximately U-shaped. More precisely, it comprises a first approximately straight portion 54 starting from the first end link 36 and continuing with a plurality of adjacent intermediate links 34 arranged to be linearly continuous with each other. At its other end, this straight portion 54 is followed by a curved part 56 composed of a plurality of adjacent intermediate links 34 inclined relative to each other. The inclination between any two directly consecutive links 34 is preferably regular so as to obtain the required curved shape, this inclination being fixed such that the stress in the cables 32 located within these links is not greater than the stress that they can resist, particularly considering their bending limit.

In this respect, the relative pivoting amplitude between any two directly consecutive links 34 that is limited by a system of stops that will be described later, is preferably of the order of 30° or less, starting from a position in which the two links 34 concerned are in line with each other. Furthermore, the direction of this pivoting is always the same regardless of which links are considered, which in particular makes it possible to obtain a curved portion 56 in the shape of a semi-circle.

This portion 56 is then followed by a second approximately straight portion 58 terminated by a second end link 38, and in the preferred embodiment shown is composed solely of this end link 38 that is very much longer than the other links 34, 36, such that it resembles an arm.

When the mobile slat 16 is rotated about the axis 42 using the mechanism 17, the end link 38 is moved along the same trajectory, entraining all intermediate links 34 moving on the spherical surface 46 with it, as shown in FIG. 6. The links 34, 36, 38 of the two straight portions 54, 58 are partially coincident in this figure that shows the chain 30 as seen in the direction of the rotation axis 42. Furthermore, it can be seen that the chain trajectory, always seen at the angle indicated above, can be almost exactly superposed on the trajectory 48 of the slat, which effectively illustrates the close similarity between the real kinematics of the chain 30 and the kinematics of the slat 16. This particular characteristic enables a small opening 40 in the forward part of the fixed body 8, that is conducive to good aerodynamic efficiency.

Once again considering FIG. 7, when the end link 38 is moved, the last intermediate link 34 of the first straight portion 54 is progressively pivoted relative to the last but one link 34 in this straight portion 54, until the maximum pivoting amplitude between these two intermediate links 34 is reached. Starting from this moment, the last intermediate link 34 that up to that point only pivoted relative to the last but one link 34, and more generally relative to the spherical surface 46 considered fixed relative to the body 8, is then moved relative to this spherical surface 46, with the following links of the curved portion 56 that it has just entered.

Simultaneously, when the end link 38 moves with a movement considered as a translation movement in a top view, the last intermediate link 34 of the curved portion 56 is progressively pivoted relative to the last link of the second approximately straight portion 58, namely the second end link 38, until the two links concerned are aligned, these two links initially being pivoted relative to each other at maximum amplitude. Starting from this moment, the intermediate link 34 concerned forms an integral part of the second approximately straight portion 58, and is therefore entrained along a circular trajectory identical to the trajectory of the second end link 38.

Therefore, the proposed arrangement shows first and second straight portions 54, 58 that remain approximately parallel and at an equal distance during movement of the chain 30 to extend/retract the mobile slat 16, such that the kinematics of the chain 30 is perfectly controlled and self-stabilised at all times.

Figure 8:
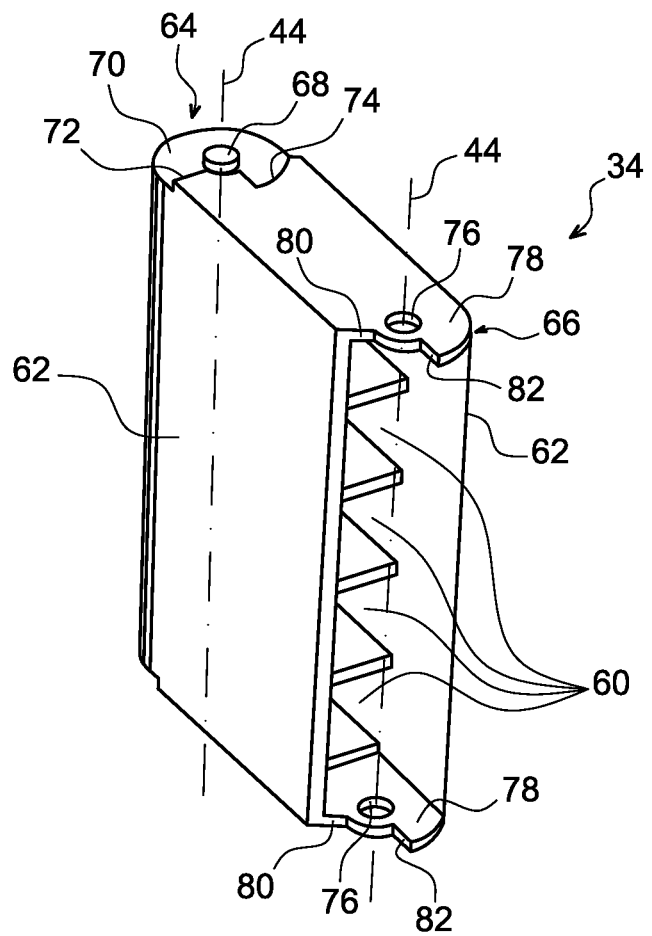
FIG. 8 shows a perspective view of one of the intermediate links of the cable carrier chain shown in the previous figures.

Now, with reference to FIG. 8, one of the intermediate links 34 of the chain 30 can be seen, for example defining several adjacent cable passage housings 60, each opening up on each side of the link 34, along the direction of the chain. Thus, cables passing through these housings 60 are protected by the two parallel and opposite side plates 62 of the link, which very much reduces the risks of mechanical damage to these cables and reduces exposure to external atmospheric agents. With this preferred configuration, it is considered that the electrical cables 32 are located and protected "inside" the carrier chain.

The link 34 is provided with a male end 64 and an opposite female end 66 complementary to the male end, it naturally being understood that the male end of any link of the chain will be designed to cooperate with the female end of the consecutive link, and vice versa.

The male end 64 comprises two articulation pins 68 (only one of which is visible due to the perspective view) arranged about axis 44, the first being provided on the top of the link projecting upwards from a recess 70, and the second being provided on the bottom of the link projecting downwards from a similar recess. Each recess 70 is limited by a first stop surface 72 and a second stop surface 74.

The female end 66 comprises two articulation orifices 76 arranged about axis 44, the first being provided on the top of the link on a side 78, and the second being provided similarly on a side 78 located on the bottom of the link. Each side 78 has a first stop surface 80 and a second stop surface 82.

Figure 9:
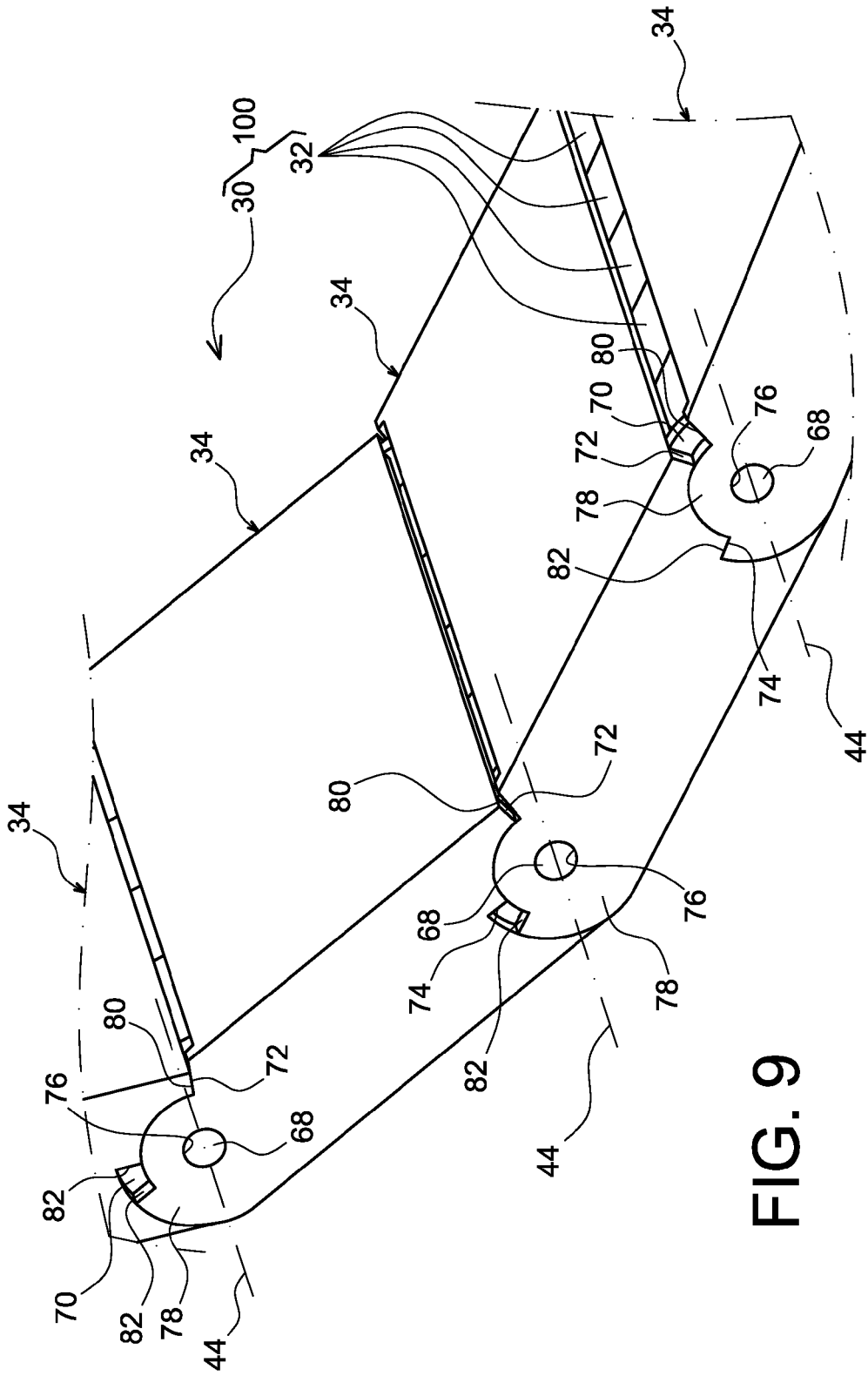
FIG. 9 shows a perspective view of a plurality of articulated intermediate links, stopped in contact with each other.

As can be seen in FIG. 9 showing an assembly 100 comprising the chain 30 housing the cables 32, the intermediate links 34 cooperate in pairs such that the pins 68 are housed in their corresponding orifices 76 so as to define the articulation axes 44. Furthermore, in order to obtain this cooperation, the sides are positioned in their corresponding recesses 70.

Concerning the first two aligned links 34, these links form part of the above-mentioned straight portion and are blocked in rotation relative to each other by the second stop surfaces 74, 82 coming into contact with each other in pairs, the first stop surfaces 72, 80 being separated from each other.

The last two links 34 pivoted at a maximum amplitude relative to each other form part of the above mentioned curved portion and are blocked in rotation relative to each other by the first stop surfaces 72, 80 coming into contact in pairs, the second stop surfaces 74, 82 being separated from each other.

The two intermediate links 34 shown in FIG. 9 are presented partially pivoted relative to each other, this intermediate position being adopted during movement of the chain 30 by which the last intermediate link 34 passes from the first straight portion to the curved portion.

At this stage, contact between the second stop surfaces 74, 82 is broken. However, the second stop surfaces 74, 82 have not yet come into contact due to the fact that the maximum pivoting amplitude between these two links has not yet been reached.

Figure 10:
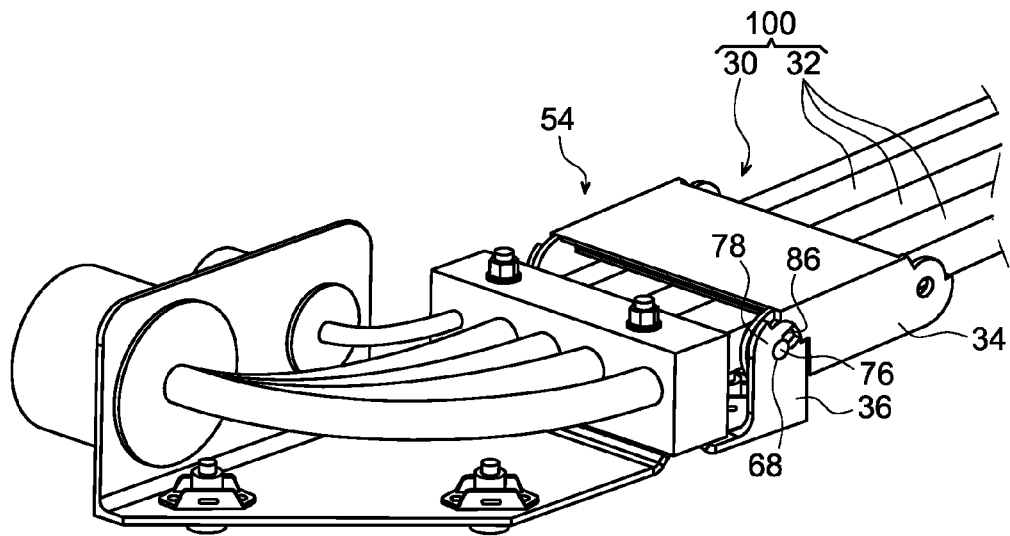
FIG. 10 shows a perspective view of a chain end link fixed on a wing fixed central body.

FIG. 10 shows that the first intermediate link 34 of the first straight portion 54 may be installed removably on the first end link 36, for example by clipping possibly due to the presence of a notch 86 formed on each side 78 and opening up into the associated articulation orifice 76. Thus, the articulation pin 68 may be introduced or extracted from its associated articulation orifice 76 by sliding in the notch 86 provided for this purpose. This mechanical link is deliberately broken by an operator when the slat has to be removed from the wing fixed central body, for example for maintenance reasons. It is also automatically broken following a shock in flight on the slat causing loss of the slat, to avoid damaging the fixed central wing body supporting this slat.

Figure 11:
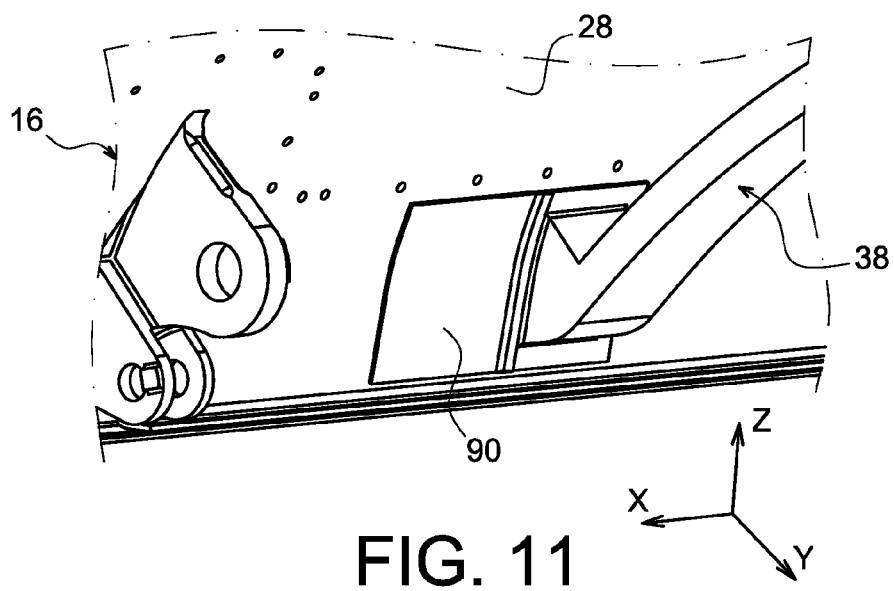
FIG. 11 shows a perspective view of a chain end link rigidly fixed onto the leading edge mobile slat.
Figure 12:
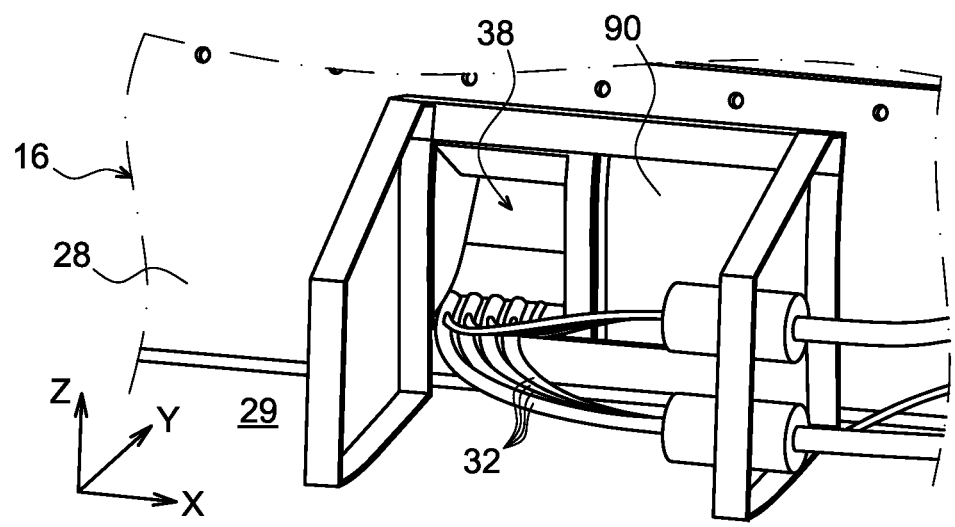
FIG. 12 shows a perspective view from the inside of the leading edge mobile slat, showing how it is connected with the chain end link shown in FIG. 11.

Finally, FIGS. 11 and 12 show the connection of the second end link 38 in the form of an arm onto the closing skin 28 of the slat, close to an access door 90 through which the cables 32 originating from the link 38 can be manipulated and arranged in the compartment 29 of the mobile slat 16. As in FIGS. 5 and 6, in FIG. 11 it can be seen that the arm 38 is globally curved and more specifically is circular, so that it can also remain on the spherical surface 46, when movement is provoked by movement of the slat 16.

Obviously, various modifications can be made by those skilled in the art as it has just been described, solely as non-limitative examples. In this respect, note that the mobile slats that have just been described refer to slats that can be deployed on rails, but the invention is equally applicable to any other type of mobile slat such as "drop nose" slats that are simply articulated on the wing fixed portion.

The invention claimed is:

1. Aircraft wing (4) comprising a wing fixed central body (8), and a leading edge mobile slat (16) designed to be moved in rotation relative to said fixed central body along a circular trajectory (48) inscribed on a sphere (50) with centre (C), located on a rotation axis (42) of the leading edge mobile slat (16) relative to said wing fixed central body (8);

wherein said wing also comprises an assembly (100) comprising a chain (30) and at least one cable (32) supported by said chain connected rigidly at its two ends to the fixed central body (8) and to the leading edge mobile slat (16) respectively, said chain comprising links (34, 36, 38) articulated to each other through articulation axes (44) that converge towards the centre (C).

2. Wing (4) according to claim 1, wherein said articulated links (34, 36, 38) are arranged on a spherical surface (46) centred on said centre (C) towards which said articulation axes converge (44).

3. Wing (4) according to claim 1 or claim 2, wherein the amplitude of the relative pivoting between any two consecutive links (34) is limited by a system of stops.

4. Wing (4) according to claim 3, wherein the relative pivoting amplitude is less than or equal to 30°.

5. Wing (4) according to claim 1, wherein a top view of said chain (30) shows a first approximately straight portion (54) starting from a first chain end link (36) fixed onto said wing fixed central body (8), a curved part (56), and a second approximately straight portion (58) terminated by a second chain end link (38) rigidly fixed onto said leading edge mobile slat (16), regardless of the position of said leading edge mobile slat (16) relative to the wing fixed central body (8).

6. Wing (4) according to claim 5, wherein said curved part (56) forms approximately a portion of a circle as seen in a top view.

7. Wing (4) according to claim 1, wherein said chain (30) supports several cables (32).

8. Wing (4) according to claim 1, wherein said chain (30) supports several cables (32) supplying power to a de-icing system (27) integrated into the leading edge mobile slat (16).

* * * * *

UNITED STATES PATENT AND TRADEMARK OFFICE
CERTIFICATE OF CORRECTION

PATENT NO. : 8,408,500 B2  
APPLICATION NO. : 12/668752  
DATED : April 2, 2013  
INVENTOR(S) : Crepin et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 644 days.

Signed and Sealed this
First Day of September, 2015

Michelle K. Lee
*Director of the United States Patent and Trademark Office*